Oct. 4, 1966 C. O. BUNN 3,276,247
METHOD AND SYSTEM FOR DETECTING AND LOCATING PIPE LINE LEAKAGE
Filed May 21, 1964
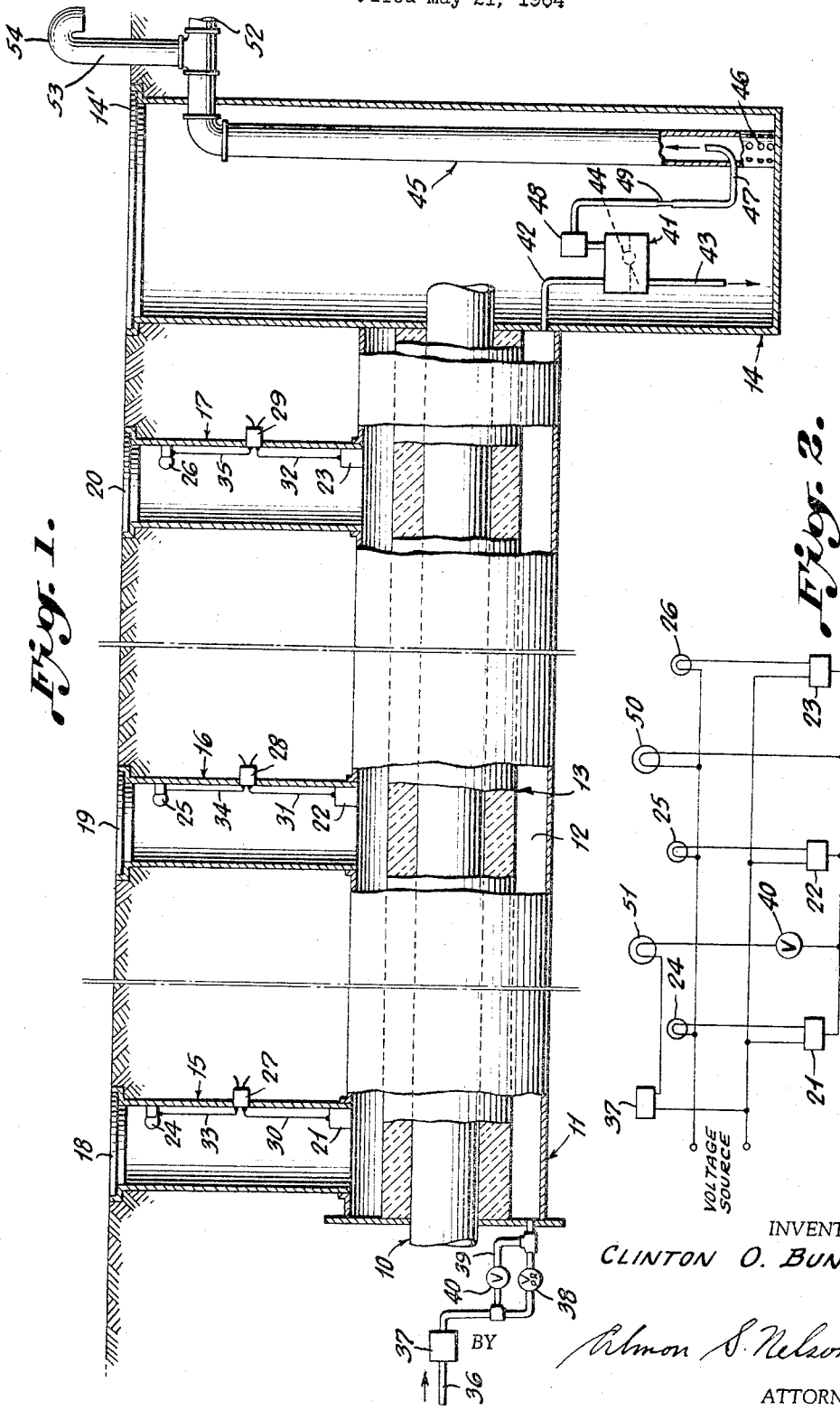
INVENTOR
CLINTON O. BUNN
BY Almon S. Nelson.
ATTORNEY

United States Patent Office 3,276,247
Patented Oct. 4, 1966

3,276,247
METHOD AND SYSTEM FOR DETECTING AND LOCATING PIPE LINE LEAKAGE
Clinton O. Bunn, 5210 Columbia Road, Springfield, Va.
Filed May 21, 1964, Ser. No. 369,146
9 Claims. (Cl. 73—40.5)

This invention relates to buried pipe line installation of the type commonly employed for conveying steam from a steam generating plant to a point or points of use and more particularly to a method and system for detecting and locating leaks in the pipe line installation.

As is well known, it is now common practice to convey many products by varied pipe line installations and it is also common practice to supply steam to various points of use from a central steam generating plant and obviously, any varied pipe line installation is subject to deterioration with consequent leakage and the rapid and economical location of leaks in such pipe line installations has proven to be a troublesome matter. Obviously, relatively small leaks can occur and remain undetected for a considerable period of time thereby reducing the efficiency of the installation and also promoting accelerated deterioration thereof and even though a leak may be of sufficient size to provide some indication of the existence thereof, unless there is some evidence above ground, the location of such leak is quite difficult.

Pipe line installations of the type under consideration frequently include a product conveying pipe with a casing surrounding the pipe in concentric spaced relation to provide an annular space between the pipe and the casing and insulation may be provided in the annular space as desired, depending on the requirements of the installation. Leakage can occur in the central product conveying pipe and also in the casing and obviously, some means for determining the presence of a leak, either in the product conveying pipe or in the casing and to indicate the approximate location of such leak would materially contribute to a reduction in cost of pipe line maintenance. Also, should a leak occur either in the product conveying pipe or in the casing, it is highly desirable that some means be provided to remove any water or other liquid which may collect between the product conveying pipe and the casing in order to reduce the deterioration to a minimum pending location and repair of the leak.

It is accordingly an object of the invention to provide a system for detecting and locating leakage in a buried pipe line installation, which system is relatively simple in construction and which will provide protection over long periods of time without attention or maintenance.

A further object of the invention is the provision of a system for detecting and locating leakage in a pipe line installation, which installation includes a product conveying pipe and a casing surrounding such pipe in concentric spaced relationship, such system providing an indication of leakage either in the product conveying pipe or in the surrounding casing.

A still further object of the invention is the provision of a system for detecting and locating leakage in a pipe line installation and including means for removing liquid collecting as a result of such leakage.

Another object of the invention is the provision of a system for detecting and locating leakage in a pipe line installation, such installation including a product conveying pipe surrounded by a casing to provide an annular space therebetween, such system also providing means for preventing the entry of ground water into the space between the casing and the product conveying pipe in the event of a leak in the casing.

A further object of the invention is the provision of a system for detecting and locating leakage in a pipe line installation, which system may be entirely automatic in operation or may be monitored manually.

A still further object of the invention is the provision of a method of detecting and locating leakage in a buried pipe line installation.

Further objects and advantages of the invention will be apparent from the following description taken in conjunction with the accompanying drawing wherein:

FIG. 1 is an elevational view with parts broken away and in section and showing a pipe line installation incorporating the leakage detecting system of this invention; and FIG. 2 is a schematic diagram showing the electrical circuit of the leakage detecting system of this invention.

With continued reference to the drawing, there is shown a more or less conventional buried pipe line installation including a product conveying pipe 10 and a casing 11 surrounding the pipe 10 in concentric spaced relation to provide an annular space 12 between the pipe 10 and the casing 11 and if desired, for certain types of installations suitable insulation 13 may partially fill the space 12 in order to adequately insulate the product conveying pipe 10. At suitable spaced locations along the pipe line there may be provided a sump 14 having a removable cover 14' thereon located at ground level and the purpose of such sump will be later described.

The leakage detecting and locating system of this invention comprises a plurality of stand pipes 15, 16 and 17 located at suitable intervals along the pipe line installation and each of the stand pipes is connected to the casing 11 in communication with the annular space 12. While three stand pipes are shown in the drawing, it will be understood that this is for illustrative purposes only and that any desired number of such stand pipes may be employed depending upon the requirement of the particular pipe line installation. The stand pipes 15, 16 and 17 extend upwardly from the casing 11 to ground level and are provided with airtight removable covers 18, 19 and 20.

Provided in the stand pipes 15, 16 and 17 are vapor sensitive switches 21, 22 and 23 which are disposed adjacent the annular space 12 and also provided in the stand pipes 15, 16 and 17 are indicator lights 24, 25 and 26 which are disposed adjacent the upper ends of the stand pipes 15, 16 and 17 and which are easily accessible upon removal of the covers 18, 19 and 20. Electrical junction boxes 27, 28 and 29 may be provided on the stand pipes 15, 16 and 17 and the junction boxes are connected through suitable electrical conductors 30, 31 and 32 with the vapor sensitive switches 21, 22 and 23 and with suitable electrical conductors 33, 34 and 35 with the indicating lights 24, 25 and 26.

A compressed air supply conduit 36 is connected through a suitable flow indicating device 37 and a pressure reducing valve 38 with the annular space 12 within the casting 11. A by-pass 39 is provided around the pressure reducing valve 38 and the by-pass 39 may be controlled by a suitable shutoff valve 40.

Disposed in the sump 14 below the level of the casing 11 is a drain tank 41 connected to the annular space 12 by a drain pipe 42. For convenience of illustration, the air supply conduit 36 is shown as being connected to one end of the annular space 12 while the drain pipe 42 is connected to the opposite end of such annular space. Conveniently, the sidewall of the sump 14 may be utilized as a closure for the ends of casing 11 terminating at opposite sides of the sump 14, or if desired, other suitable closure means may be utilized for the opposite ends of the casing 11 in order to close the annular space 12.

A suitable outlet 43 may be provided on the drain tank 41 for discharging the contents thereof into the sump 14 and the outlet 43 may be controlled by a conventional float valve 44 provided in the drain tank 41 for opening the outlet 43 when the liquid in the drain tank 41 reaches a predetermined level and closing the outlet prior to complete drainage of liquid therefrom in order to prevent the escape of air from the annular space 12. A conventional air lift pump 45 is provided in the sump 14 with suitable strainer means 46 at the lower end of the pump 45 for permitting the entry of liquid into the pump and an air pipe 47 connects the pump 45 with a pressure relief valve 48 which in turn is connected to the drain tank 41 above the liquid level therein. The air pipe 47 may be provided with a calibrated orifice 49 in order to facilitate operation of the air lift pump 45.

The discharge of the pump 45 may be connected to a conduit 52 which in turn may empty into a sewer or other suitable liquid disposal facility and the conduit 52 may be provided with a suitable vent pipe 53 extending above the ground and terminating in a return bend 54.

With particular reference to FIG. 2, there is shown the electrical circuit of the leakage detecting system of this invention and in addition to the components described above, the system may include a central indicating light 50 which is connected in such a manner as to be energized upon the closing of any one of the vapor sensitive switches 21, 22 or 23 and also included is a central flow indicating light 51 which is connected to the flow indicator 37 and will be energized upon a pre-determined flow of air through the supply conduit 36. Also, as indicated in the circuit diagram, the valve 40 in the by-pass 39 is electrically operated and will be opened to admit air to the space 12 around the pressure reducing valve 38 upon the closing of any one of the vapor sensitive switches 21, 22 or 23.

In the event a leak occurs in the product conveying pipe 10, vapor will collect in the annular space 12 adjacent the location of the leak and such vapor will serve to actuate the nearest vapor sensitive switch 21, 22 or 23 to close the same thereby energizing the appropriate indicating light 24, 25 or 26 and at the same time, energizing the central indicating light 50 and furthermore, closing of any one of the vapor sensitive switches 21, 22 or 23 will operate to open the by-pass valve 40 thereby applying full air pressure to the annular space 12. Application of full air pressure to the annular space 12 will result in opening the pressure relief valve 48 which in turn will permit the flow of air to the air lift pump 45 thereby evacuating any liquid which may have collected in the sump 14 as the result of leakage in the pipe line system. Furthermore, the flow of air through the space 12 resulting from opening of the by-pass valve 40 will prevent the closing of any vapor sensitive switch 21, 22 or 23 upstream from the point of the leak, since the flow of air in the space 12 will serve to scavenge any vapor from the space 12 upstream from the leak and, therefore, upon the indication of a leak provided by the central indicator 50 it is only necessary to successively remove the covers 18, 19 or 20 from the stand pipes 15, 16 and 17 in a direction downstream from the point of introduction of the air pressure with the result that the first indicating light 24, 25 or 26 which is found to be energized will indicate the approximate location of the leak and appropriate repair measures may then be taken.

Normally, a static air pressure is maintained in the annular space 12 by reason of the pressure reducing valve 38 and this pressure is not enough to open the relief valve 48 with the result that normally there will be no air flow through the space 12 and as a consequence, the air lift pump 45 only operates after opening of the by-pass valve 40 to introduce full air pressure into the annular space 12. The system operates, as described above, to indicate the presence of a leak in the product conveying pipe 10 and to approximately locate the same and the system may also be utilized to indicate the presence of a leak in the casing 11 and at the same time, to prevent the entry of ground water into the space 12 in the event of a leak in the casing 11. As above stated, there is normally a static air pressure in space 12 with no air flow through the air supply conduit 36, but in event of a leak in the casing 11, air will flow therethrough into the surrounding earth and such flow of air will be indicated by the flow indicating device 37 which in turn will energize the central flow indicating light 51 thereby providing an indication of a leak in the casing 11. At this time, a suitable tracer gas, such as methane or other well known tracer gas may be introduced into the air supply flowing through the air supply conduit 36 and by the use of suitable gas detecting instruments utilized at ground level along the pipe line the presence of the tracer gas in the atmosphere at that point may be detected and this, of course, will provide an approximate location for the leak in the casing 11. Also, flow of air from the annular space 12 through the leak in the casing 11 will prevent the entry of ground water into such space thereby precluding deterioration of the installation which would occur if the ground water were permitted to enter the space 12.

As may be seen from the above description, the system of this invention is entirely automatic in operation to an indication of a leak, either in the product conveying pipe 10 or in the casing 11, and in order to ascertain the presence of a leak, it is only necessary to periodically observe the central indicating lights 50 or 51 and, of course, any other suitable indicating means, such as an audible alarm may be employed. The system may be conveniently installed, together with a conventional pipe line installation and the cost of such system will be more than offset by the reduction in time and effort necessary to locate a leak in the installation, particularly where no evidence of such leak appears above ground. Furthermore, the system, as stated above, operates to reduce deterioration of the pipe line installation by reason of providing a prompt and accurate indication of a leak together with the approximate location thereof and also operates to prevent the entry of ground water into the installation in the event of a leak in the surrounding casing. Furthermore, in the event of a leak in the product conveying pipe any liquid collecting as a result of such leak is automatically removed thereby preventing deterioration by reason of the presence of such liquid in the installation.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A system for detecting and locating leakage in a buried pipe line installation including a product conveying pipe and a casing surrounding said pipe in concentric spaced relation to provide an annular space between said pipe and said casing, said system comprising a plurality of stand pipes spaced longitudinally of said installation, each stand pipe being connected to said casing in communication with said space and extending to ground level, an airtight removable cover for each stand pipe, a vapor sensitive switch in each stand pipe adjacent said space, an indicating light in each stand pipe, a central indicator, said switches serving to energize said lights and said central indicator, a compressed air supply conduit connected to said space, a pressure reducing valve in said conduit, a by-pass around said reducing valve, a shutoff valve in said by-pass, a drain tank, a drain pipe connecting said space and said tank at a point longitudinally spaced from the connection of said supply conduit, a sump, a discharge from said tank to said sump, a float valve in said tank for controlling flow of liquid from said tank to said sump, an air lift pump in said sump, a pressure relief valve connected to said tank above the liquid level, an air pipe connecting said relief valve and said sump and a calibrated orifice in said air pipe.

2. A system as defined in claim 1, in which a flow indicator is provided in said supply conduit.

3. A system as defined in claim 1, in which said space is partially filled with insulation.

4. A system for detecting and locating leakage in a buried pipe line installation including a product conveying pipe and a casing surrounding said pipe in concentric spaced relation to provide an annular space between said pipe and said casing, said system comprising a plurality of stand pipes spaced longitudinally of said installation, each stand pipe being connected to said casing in communication with said space and extending to ground level, an airtight removable cover for each stand pipe, a vapor sensitive switch in each stand pipe adjacent said space, an indicating light in each stand pipe, a central indicator, said switches serving to energize said lights and said central indicator, a compressed air supply conduit connected to said space, a pressure reducing valve in said conduit, a by-pass around said reducing valve, a shutoff valve in said by-pass, a drain tank, a drain pipe connecting said space and said tank at a point longitudinally spaced from the connection of said supply conduit, a sump, a discharge from said tank to said sump, a float valve in said tank for controlling flow of liquid from said tank to said sump, an air lift pump in said sump, a pressure relief valve connected to said tank above the liquid level and an air pipe connecting said relief valve and said pump.

5. A system for detecting and locating leakage in a buried pipe line installation including a product conveying pipe and a casing surrounding said pipe in concentric spaced relation to provide an annular space between said pipe and said casing, said system comprising a plurality of stand pipes spaced longitudinally of said installation, each stand pipe being connected to said casing in communication with said space and extending to ground level, an airtight removable cover for each stand pipe, a vapor sensitive switch in each stand pipe adjacent said space, an indicating means in each stand pipe, a central indicator, said switches serving to energize said indicating means and said central indicator, a compressed air supply conduit connected to said space, a pressure reducing valve in said conduit, a by-pass around said reducing valve, a shutoff valve in said by-pass, a drain tank, a drain pipe connecting said space and said tank at a point longitudinally spaced from the connection of said supply conduit, a sump, a discharge from said tank to said sump, a float valve in said tank for controlling flow of liquid from said tank to said sump, an air lift pump in said sump, a pressure relief valve connected to said tank above the liquid level and an air pipe connecting said relief valve and said sump.

6. A system as defined in claim 5, in which the discharge of said pump is connected to a conduit which in turn empties into a liquid disposal facility and a vent pipe connected to said last named conduit, said vent pipe extending above ground level and terminating in a return bend.

7. A system for detecting and locating leakage in a buried pipe line installation including a product conveying pipe and a casing surrounding said pipe in concentric spaced relation to provide an annular space between said pipe and said casing, said system comprising a plurality of stand pipes spaced longitudinally of said installation, each stand pipe being connected to said casing in communication with said space and extending to ground level, an airtight removable cover for each stand pipe, a vapor sensitive switch in each stand pipe adjacent said space, an indicating means in each stand pipe, said switches serving to energize said indicating means, a compressed air supply conduit connected to said space, a pressure reducing valve in said conduit, a by-pass around said reducing valve, a shutoff valve in said by-pass, a drain tank, a drain pipe connecting said space and said tank at a point longitudinally spaced from the connection of said supply conduit, a sump, a discharge from said tank to said sump, a float valve in said tank for controlling flow of liquid from said tank to said sump, an air lift pump in said sump, a pressure relief valve connected to said tank above the liquid level and an air pipe connecting said relief valve and said sump.

8. A method of detecting and locating leakage in a buried pipe line installation including a product conveying pipe and a casing surrounding said pipe in concentric spaced relation to provide an annular space between said pipe and said casing, said method comprising the steps of providing longitudinally spaced vapor sensitive switches in said space to energize separate indicators for each switch and a central indicator, applying a predetermined low air pressure to said space at one end, providing a pressure relief valve at the opposite end of said space to prevent air flow at said low pressure, applying a higher air pressure to said space to open said relief valve and provide air flow through said space upon energization of said central indicator and sequentially inspecting said separate indicators from the upstream end of said installation to locate the first energized indicator thereby ascertaining the approximate location of a leak in said pipe.

9. A method as defined in claim 8, and including the additional steps of obtaining an indication of any air flow through said space at said low pressure, introducing a tracer gas into said space and analyzing the air at ground level along said installation to provide an indication of said gas thereby approximately locating a leak in said casing.

No references cited.

LOUIS R. PRINCE, *Primary Examiner.*

UNITED STATES PATENT OFFICE
CERTIFICATE OF CORRECTION

Patent No. 3,276,247                                              October 4, 1966

Clinton O. Bunn

It is hereby certified that error appears in the above numbered patent requiring correction and that the said Letters Patent should read as corrected below.

Column 1, lines 14 and 17, for "varied", each occurrence, read -- buried --.

Signed and sealed this 29th day of August 1967.

(SEAL)
Attest:

ERNEST W. SWIDER
Attesting Officer

EDWARD J. BRENNER
Commissioner of Patents